United States Patent
Pham

(10) Patent No.: US 11,395,496 B2
(45) Date of Patent: Jul. 26, 2022

(54) MULTIPURPOSE MOSQUITO REPELLANT COMPOSITION AND METHOD OF MANUFACTURING THE SAME

(71) Applicant: Loc Thanh Pham, Ho Chi Minh (VN)

(72) Inventor: Loc Thanh Pham, Ho Chi Minh (VN)

(73) Assignee: DIEN TRUC ESSENTIAL OIL COMPANY LIMITED, Ho Chi Minh (VN)

( * ) Notice: Subject to any disclaimer, the term of this patent is extended or adjusted under 35 U.S.C. 154(b) by 460 days.

(21) Appl. No.: 16/379,813

(22) Filed: Apr. 10, 2019

(65) Prior Publication Data

US 2020/0323221 A1 Oct. 15, 2020

(51) Int. Cl.

| | | |
|---|---|---|
| *A01N 65/44* | (2009.01) | |
| *A01N 65/40* | (2009.01) | |
| *A01N 65/22* | (2009.01) | |
| *A01N 65/20* | (2009.01) | |
| *A01N 65/48* | (2009.01) | |
| *A01N 65/36* | (2009.01) | |
| *A01N 31/04* | (2006.01) | |
| *A01N 27/00* | (2006.01) | |
| *A01N 43/16* | (2006.01) | |
| *A01N 31/02* | (2006.01) | |
| *A01N 31/06* | (2006.01) | |
| *A01N 31/16* | (2006.01) | |
| *A01N 65/28* | (2009.01) | |

(52) U.S. Cl.
CPC ............ *A01N 65/44* (2013.01); *A01N 27/00* (2013.01); *A01N 31/02* (2013.01); *A01N 31/04* (2013.01); *A01N 31/06* (2013.01); *A01N 31/16* (2013.01); *A01N 43/16* (2013.01); *A01N 65/20* (2013.01); *A01N 65/22* (2013.01); *A01N 65/28* (2013.01); *A01N 65/36* (2013.01); *A01N 65/40* (2013.01); *A01N 65/48* (2013.01)

(58) Field of Classification Search
CPC ..................................................... A01N 65/44
See application file for complete search history.

(56) References Cited

U.S. PATENT DOCUMENTS

2011/0135764 A1* 6/2011 Enan ...................... A01N 31/14
424/745

* cited by examiner

*Primary Examiner* — Melissa L Fisher

(57) ABSTRACT

A multipurpose mosquito repellent composition obtained by a process of forming a foundation mixture by mixing an anti-insect extract/essential oil with at least two odorless and anti-insect effect prolonging extract/essential oils; and mixing the foundation mixture with a plurality of aromatic and medicinal oils in a specific order with each of the plurality of aromatic and medicinal oils having a specific predetermined percentage (%) by weight relative to the total weight of the multipurpose mosquito repellent composition.

5 Claims, 3 Drawing Sheets

MULTIPURPOSE MOSQUITO REPELLANT COMPOSITION AND METHOD OF MANUFACTURING THE SAME

FIELD OF THE INVENTION

The present invention relates generally to the field of mosquito repellent products. More specifically, the present invention relates to a multipurpose composition that can be used not only as a mosquito repellent but also as perfumes, aroma therapeutic products, and medicinal products.

BACKGROUND ART

Mosquitoes are the most dangerous insects. They carry and transmit deadly deceases such as malaria, Filariasis, Dengue fever, yellow fever, Japanese encephalitis, Ross River virus, Burma forest virus, Murrey Valley encephalitis, West Nile, Zika, etc. Every year mosquito borne malaria kills more than one million people. Besides being dangerous, mosquitoes are extremely pestering because they feed on human blood. Mosquitoes can detect human preys by their antennae, their eyes, and their thermal sensors. Using their antennae, mosquitoes sense the human preys by detecting a plume of carbon dioxide ($CO_2$) in human breaths from hundreds of feet away. Once they approach close to the prey, they can sense more than 300 chemical odors released by the human skin, which includes octanol. Mosquitoes also use their large compound eyes, designed for spotting motion, to help guide them in. Two simple eyes, called ocelli, are photosensitive, so the mosquitoes key on lights and bright colors as well. Finally, thermal sensors on their antennae and around their mouths detect heat emanating from warm-blooded bodies, allowing them to land on exposed skin and find blood capillaries closest to the surface. Then, mosquitoes pierce the human skin with a serrated proboscis containing two tubes. Through one, they inject saliva that numbs the area and prevent the blood from clotting. Through the other, they begin to suck blood into their abdomen. The mosquitoes will drink until it is full, withdraw the proboscis and fly away. Often, the victims bitten do not even realize it until a minor allergic reaction causes the site to swell and itch.

As noted above, there exists a myriads of anti-mosquito products and methods aimed to kill, to repel, and/or cure mosquito bites. Synthetic insecticides such as dichloro-diphenyl-trichloroethane (DDT) is sprayed to eradicate mosquitoes and mosquito larvae. But the use of DDT also causes damages to birds and different harms to human health. DDT and other insecticides also affect aquatic life when they are sprayed onto the rivers to kill mosquito larvae. As a result, DDT was banned in 1972. Another well-known mosquito repellent is DEET (N,N-Diethyl-meta-toluamide) which was designed to interfere with neurons and receptors located on the mosquitos cephalic antenna and mouth-parts that detect chemicals such as lactic and carbon dioxide ($CO_2$). There are approximately 120 products use DEET, ranging from 5% to 99% DEET. Even though DEET does not present any health concern, DEET benefits have been found limited: (1) DEET can only be used as insect repellent; (2) DEET cannot be overused (over application); (3) DEET cannot be directly applied to face, cuts, wounds, or irritated skin; (4) after returning indoors, DEET users have to wash treated skins with soaps and water; (5) DEET is volatile and can only repel mosquitoes for 2 hours. Furthermore, toxic effects have been recorded after the use of DEET-based mosquito repellents, including encephalopathy in children, urticaria syndrome, anaphylaxis, hypotension and decreased heart rate.

Other means to protect humans from mosquitoes include mosquito coils, mosquito nets, and candles that use Pyrethrins. These products are not effective because, for example, mosquito nets are restrictive and for sleeping purpose only; mosquito candles and incenses have very limited operating range and restrict human mobility. Furthermore, mosquito coils, incenses, and candles were found to have negative side effects to human respiratory systems and other health related problems such as headache, nausea, and dizziness.

Mosquito zapping tools and mosquito repellent ultrasound products are also used in the market. Mosquito zapping rackets use a lethal dose of electrical charge to kill mosquitoes upon contact. However, these rackets cannot fight mosquitoes in areas infested with millions of mosquitoes like Louisiana in the U.S. and Ca Mau Point in Vietnam. Mosquito repellent products use ultrasound to mimic the sound waves produced by the beating of male mosquitoes' wings and this will repel female mosquitoes. However, these ultrasound products are implausible since the hearing ability of the females is relatively weak and the hearing system of males that is relatively strong. It is the male mosquitoes who actively seek the female mosquitoes. Thus, ultrasound waves are not effective in repelling mosquitoes.

There are also countless of mosquito repellent sprays, lotions fabricated from either plants or chemicals. However, they are found to be very volatile, easily oxidized, and evaporated within a few hours. In addition, they are very difficult to spray on skins because they are thick and heavy compounds which cause skin irritation and bad odors to users when walking for a long time in a jungle or a trail. Yet, they can serve only as mosquito repellents and need to reapply in every two hours. Many of these sprays, lotions also contain DEET whose negative effects are alluded before. These mosquito repellent liquidized products include synthetic Pyrethroids that produce neurotoxicity upon accidental ingestion. They are also emerging as a source of hydrocarbon poisoning.

Therefore what is needed is a mosquito repellent that is durable, nonvolatile, easy to use, and multi-functional which can be served as repellent, perfume, and medicinal products.

What is needed is a mosquito repellent that does not have any negative effects on users' health and does not cause any skin irritations.

Furthermore, what is needed is a mosquito repellent that is cost-effective and simple to manufacture.

The multipurpose mosquito repellent composition of the present invention meets all the above needs.

SUMMARY OF THE INVENTION

Accordingly, an objective of the present invention is to provide a multipurpose mosquito repellent composition obtained by a process that includes forming a foundation mixture by mixing an anti-insect extract/essential oil with at least two odorless and anti-insect effect prolonging extract/essential oils at predetermined percentages (%) by weight; and mixing the foundation mixture with a plurality of aromatic and medicinal oils in a specific order with each of the plurality of aromatic and medicinal oils having a specific predetermined percentage (%) by weight relative to the total weight of the multipurpose mosquito repellent composition.

Another objective of the present invention is to provide a multipurpose mosquito repellent composition that includes a citronella extract/essential oil (*Cymbopogon winterianus*) having a first predetermined percentage (%) by weight; a vanilla extract/essential oil (*Vanilla planifolia*) having a second predetermined percentage (%) by weight; an olive extract/essential oil (*Olea europaea*) having a third predetermined percentage (%) by weight; a rosemary extract/essential oil (*Rosmarinus officinalis*) having a fourth predetermined percentage (%) by weight; a peppermint extract/essential oil (*Mentha arvensis L.*) having a fifth predetermined percentage (%) by weight; and a rosewood extract/essential oil (*Aniba rosaeodora Ducke*) having a sixth predetermined percentage (%) by weight; an ginger peel extract/essential oil (*Zingiber officinale*) having a seventh predetermined fifth percentage (%) by weight; an orange extract/essential oil (*Citrus sinensis*) having an eighth percentage (%) by weight; a basil extract/essential oil (*Ocinium basilicum*) having a ninth percentage (%) by weight; an ylang ylang extract/essential oil (*Cananga odorata*) having a tenth percentage (%) by weight; a geranium extract/essential oil (*Lavandula angustifolia*) having eleventh percentage (%) by weight; a lavender extract/essential oil (*Syzygium aromaticum*) having an twelfth percentage (%) by weight; and an clove extract/essential oil (*Vanilla planifolia*) having a thirteenth percentage (%) by weight, where the sum of the first predetermined percentage (%) by weight to the thirteenth percentage (%) by weight adds up to a 100% by weight of the multipurpose mosquito repellent composition.

Yet another objective of the present invention is to provide a multipurpose mosquito repellent composition that includes an $\alpha$-pinene element having 8.81-9.65% by weight, a camphene element having 1.52%-2.69% by weight, a p-cymene element having a 1.67%-2.55% by weight, a d-limonene element having a 3.67%-4.12% by weight, a 1,8 cineol element having a 9.41%-10.93% by weight, a linalool element having 5.21%-6.33% by weight, a citronella element having 15.34%-17.82% by weight, an iso-borneol element having 4.05%-4.49% by weight, an isomenthone element having 3.05%-3.76% by weight, a menthol element having 4.42%-4.89% by weight, a geraniol element having 2.48%-2.97% by weight, an eugenol element having 4.04%-4.57% by weight, a geranyl acetate element having a 1.54%-3.04% by weight, a caryophyllene element having 1.83%-1.93% by weight, and a benzyl benzoate element having 2.03%-2.54% by weight.

In view of the foregoing, another objective of the present invention is to obtain various multipurpose mosquito repellent compositions, having three different formulations depending on the relative percentage (%) by weight of each component, which can be used as mosquitoes/insects repellents, perfumes, aroma-therapeutic products, medicinal products such as analgesic products, expectorant products, and skincare products, et cetera.

Another objective of the present invention is to provide a multipurpose mosquito repellent composition that is non-volatile—lasting for more than two hours—and light in weight so that it is easy to wear, i.e., it does not cause any discomforts and irritations to the users' skin.

Another objective of the present invention is to provide an easy and cost-effective process of making the above described multipurpose anti-mosquito composition that includes: forming a foundation mixture by mixing an anti-insect extract/essential oil with at least two odorless, diluting, and anti-insect effect prolonging extract/essential oils; and mixing the foundation mixture with a plurality of aromatic and medicinal oils in a specific order with each of the plurality of aromatic and medicinal oils having a specific predetermined percentage (%) by weight relative to the total weight of the multipurpose mosquito repellent composition.

Finally, another objective of the present invention is to create a foundation mixture that enables other aromatic and medicinal compounds to be homogeneously mixed with the foundation mixture to create a multipurpose composition.

These and other advantages of the present invention will no doubt become obvious to those of ordinary skill in the art after having read the following detailed description of the preferred embodiments, which are illustrated in the various drawing Figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
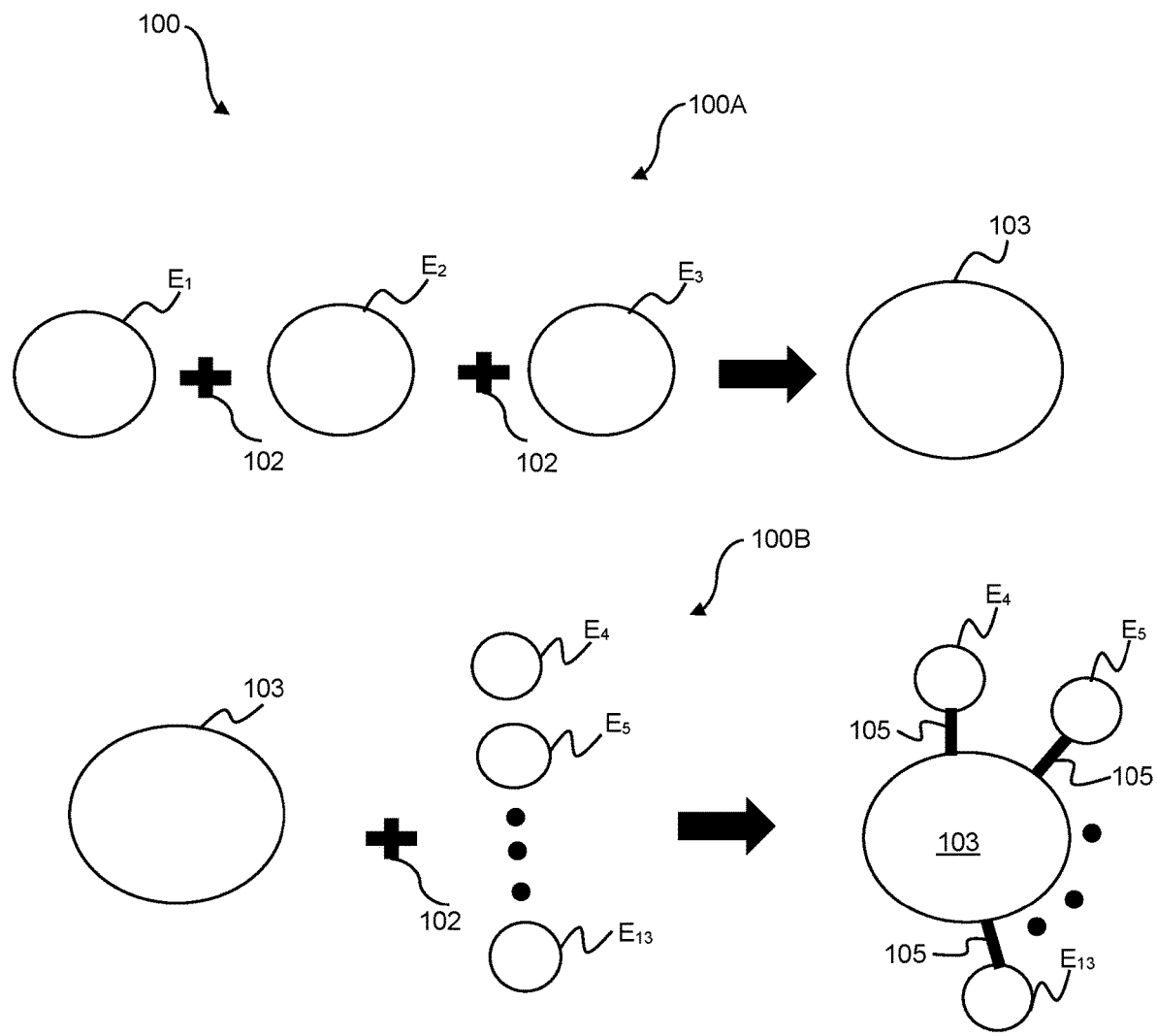
FIG. 1 is a conceptual block diagram illustrating the principle of making the multipurpose mosquito repellent composition in accordance with an exemplary embodiment of the present invention.

One embodiment of the invention is now described with reference to FIG. 1. FIG. 1 illustrates a conceptual block diagram of a method 100 including a first stage 100A and a second stage 100B of manufacturing a multipurpose mosquito repellent composition in accordance with an exemplary embodiment of the present invention.

In a first stage 101, an anti-insect extract/essential oil $E_1$ having mosquito repellent properties is mixed with at least two odorless, diluting, anti-insect effect prolonging extract/essential oils $E_2$ and $E_3$ to form a foundation mixture 103. In many aspects of the present invention, foundation mixture 103 is defined as a mixture that is capable of having the following functions: (1) prolong the anti-insect properties of anti-insect extract/essential oil $E_1$; (2) dilute the strong aroma of anti-insect extract/essential oil $E_1$; (3) act as a reactant to homogeneously dissolve other aromatic and medicinal extract/essential oils having the exact percentage (%) by weight. Thus, foundation mixture 103 is created as a reactant to allow other aromatic and medicinal extract/essential oils to be admixed to create the multipurpose mosquito repellent composition of the present invention. In other words, without foundation mixture 103, other aromatic and medicinal extract/essential oils cannot be homogeneously dissolved in anti-insect extract/essential oil $E_1$.

It will be noted that the terminology "foundation mixture" of the present invention is defined as mixture that enables other chemical compositions each having a specific percentage (%) by weight to be homogeneously dissolved or mixed with the foundation mixture to arrive at a multipurpose mosquito repellent composition. In other words, without first forming the foundation mixture, other chemical compositions cannot be admixed to the foundation mixture to form the multipurpose mosquito repellent composition of the present invention. Equivalently, without the foundation mixture, other chemical compositions may be added together but the final composition will not achieve the characteristics or properties or aspects of the multipurpose mosquito repellent composition of the present invention such as the multipurpose aspect.

It will be noted that, within the scope of the present invention, the term "homogeneously dissolved" or "homogeneously mixed" includes the following meanings:
(a) Foundation mixture 103 completely dissolves aromatic and medicinal extract/essential oils having the correct percentage (%) by weight;
(b) Foundation mixture 103 harmoniously dissolves aromatic and medicinal extract/essential oils having the correct percentage (%) by weight without preserving any dominant aroma of anti-insect extract/essential oils $E_1$;
(c) Foundation mixture 103 acts as a reactant that enables other aromatic and medicinal extract/essential oils to contribute their medicinal properties and fragrances into foundation mixture to create the novel composition of the present invention;
(d) Foundation mixture 103 ionically reacts with other aromatic and medicinal extract/essential oils;
(e) Foundation mixture 103 covalently reacts with other aromatic and medicinal extract/essential oils;
(f) Foundation mixture 103 chemically bonds with other aromatic and medicinal extract/essential oils such as addition reactions, elimination reactions, substitution reactions, pericyclic reactions, rearrangement reactions, photochemical reactions and redox reactions to form a new chemical composition.

It will be noted that in many aspects of the present invention, the terminology "anti-insect" means insecticides, insect repellency, insect bites treatments, insect bite cures, insect bites analgesia in forms of gels, sprays, skin lotion, candles, incenses, oils. Yet, in various aspects of the present invention, the terminology "insect" includes mosquitoes, flies, beetles, bees, mites, chiggers, and other insects belong to the class Insecta.

Referring now to a second stage 100B when foundation mixture 103 is admixed to a plurality of aromatic and medicinal extract/essential oils $E_4$ to $E_{13}$, each having a predetermined percentage (%) by weight relative to the total weight of the multipurpose mosquito repellent composition of the present invention. It is also noted that the terminology "admixed" 102 used in the present invention means that foundation composition 103 is added or reacted with or dissolved homogeneously to plurality of aromatic and medicinal extract/essential oils $E_4$ to $E_{13}$ using stirrers such as magnetic stirrers. Chemical bonds 105 between foundation mixture 103 and plurality of aromatic and medicinal extract/essential oils $E_4$ to $E_{13}$ include, but not limited to, addition reactions, elimination reactions, substitution reactions, pericyclic reactions, rearrangement reactions, photochemical reactions and redox reactions to form a new chemical composition.

In view of the foregoing, an objective of the present invention is achieved by obtaining a multipurpose mosquito repellent composition obtained by a process of forming first a foundation mixture by mixing an anti-insect extract/essential oil with at least two odorless and anti-insect effect prolonging extract/essential oils; and admixing the foundation mixture with a plurality of aromatic and medicinal oils in a specific order with each of the plurality of aromatic and medicinal oils having a specific predetermined percentage (%) by weight relative to the total weight of the multipurpose mosquito repellent composition.

And yet another objective of the present invention is achieved by creating a foundation mixture that enables other aromatic and medicinal compounds to be homogeneously mixed with the foundation mixture to create a novel multipurpose composition.

Figure 2:
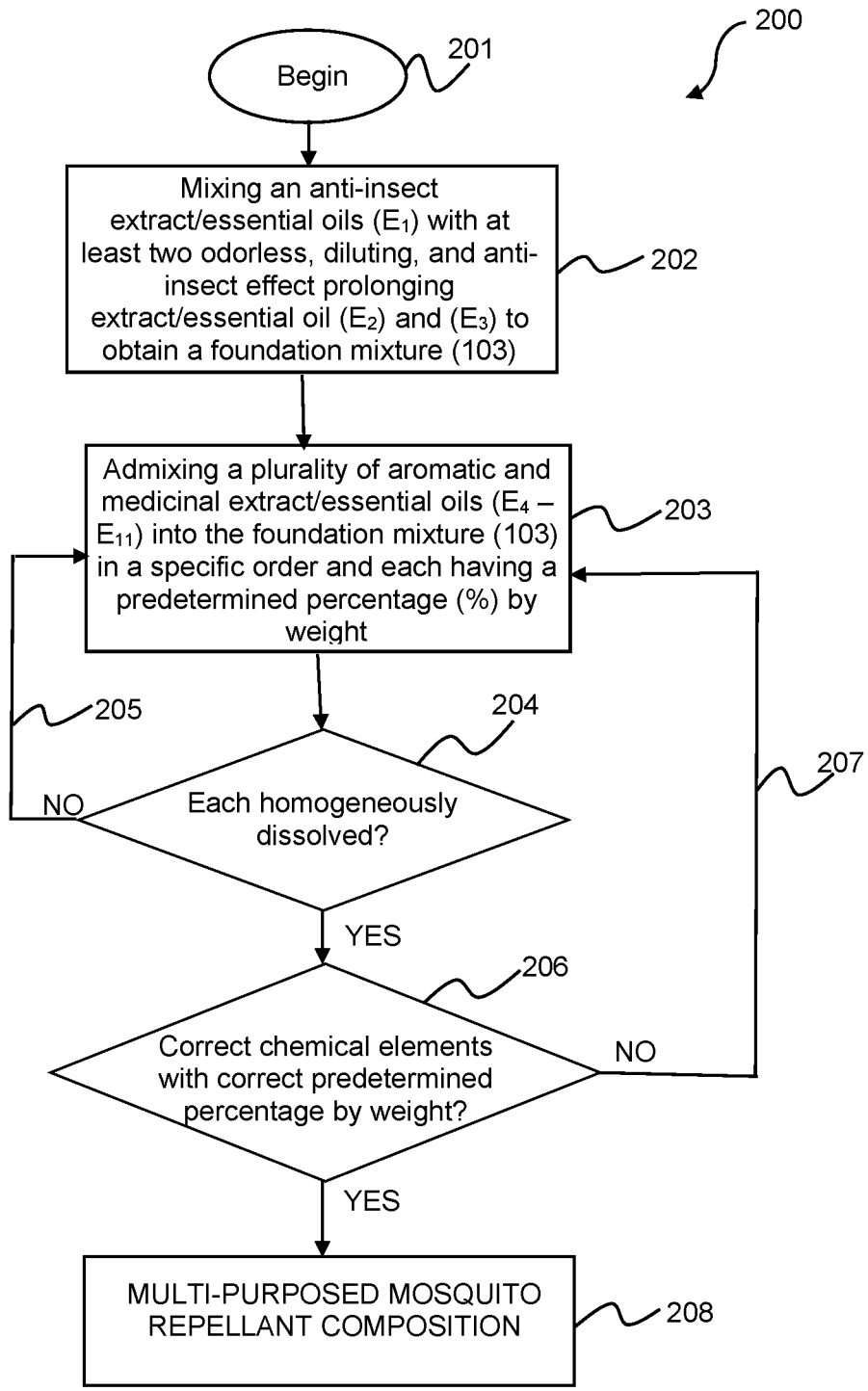
FIG. 2 is a flowchart illustrating a flowchart of a general method of manufacturing the multipurpose mosquito repellent composition based on the above principle in accordance with an exemplary embodiment of the present invention.

Next, referring to FIG. 2, a process 200 for manufacturing a multipurpose mosquito repellent composition in accordance to an exemplary embodiment of the present invention is illustrated.

At step 201, all extract/essential oils are carefully selected and collected. It is noted that extracts and essential oils are can be used in the present invention. Essential oils are collected from the different aromatic parts of plants like leaves, roots, flowers, rhizomes, etc. Extracts are plant materials are soaked into liquids such as water or aqueous solutions for a longer period of time in order to infuse their flavors, medicinal properties and aroma to the liquid.

At step 202, an anti-insect extract/essential oil is mixed with at least two odorless, diluting, and anti-insect effect prolonging extracts/essential oils to create a foundation mixture. As alluded above, in one exemplary embodiment of the present invention, the anti-insect extract/essential oil used is lemongrass; and at least two odorless, diluting, and anti-insect effect prolonging extracts/essential oils include vanilla extract/essential oil and olive extract/essential oil.

At step 203, the foundation mixture is admixed with different aromatic and medicinal extracts/essential oils each having a predetermined percentage (%) by weight to obtain the multipurpose mosquito repellent composition of the present invention. In one exemplary embodiment of the present invention, nine other aromatic and medicinal extracts/essential oils are carefully selected and admixed with the foundation mixture. The specific nine other aromatic and medicinal extracts/essential oils are listed in Table 1 below and will be discussed later. Yet in another exemplary embodiment of the present invention, each of nine aromatic and medicinal extracts/essential oils is added to the foundation mixture in a specific order. It is noted that when nine aromatic and medicinal extracts/essential oils are not added in the described specific order, the final product will not have the chemical components listed in Table 2 below. As such, the final product cannot have the multipurpose and prolonged mosquito repellency properties of the present invention.

At step 204, each time an aromatic and medicinal extracts/essential oil is admixed with the foundation mixture, the resulted temporary mixture is checked if the newly added aromatic and medicinal extracts/essential oil is homogeneously dissolved with the temporary mixture. The terminology "homogeneously dissolved" within the meaning of the present invention is described above. Step 204 is implemented by a magnetic stirrer. Magnetic stirrers are well known within the art and thus their descriptions and their operations will not be described in details in the present invention.

At step 205, if the medicinal extracts/essential oil is not homogeneously dissolved in the temporary mixture then step 203 is repeated using the magnetic stirrer or mixer until the homogeneous condition is achieved.

At step 206, each time an aromatic and medicinal extracts/essential oil is admixed with the foundation mixture, the resulted temporary mixture is checked if the aromatic and medicinal extracts/essential oil is found with the correct predetermined percentage (%) by weight. Within the meaning of the present invention, percentage (%) per weight is a mass percent. Mass percent is the ration of the mass of the aromatic and medicinal extracts/essential oil over the mass of the temporary mixture. It is also noted that the aromatic and medicinal extract/essential oil is the solute and the temporary mixture is the solution. Percent mass or percentage (%) by weight=(mass of solute/mass of solution)×100%. The units of mass are typically grams. Mass percent is also known as percent by weight or w/w %. It is also noted that the molar mass is also within the meaning of the present invention. Molar mass is the sum of the masses of all the atoms in one mole of the compound. The sum all the mass percentages add up to 100%. Step 206 can be implemented by a mass spectrometer and other similar devices.

At step 207, if the medicinal extracts/essential oil is found and/or does not have the correct predetermined percentage (%) by weight then step 206 is repeated until the correct predetermined percentage (%) by weight is achieved.

Figure 3:
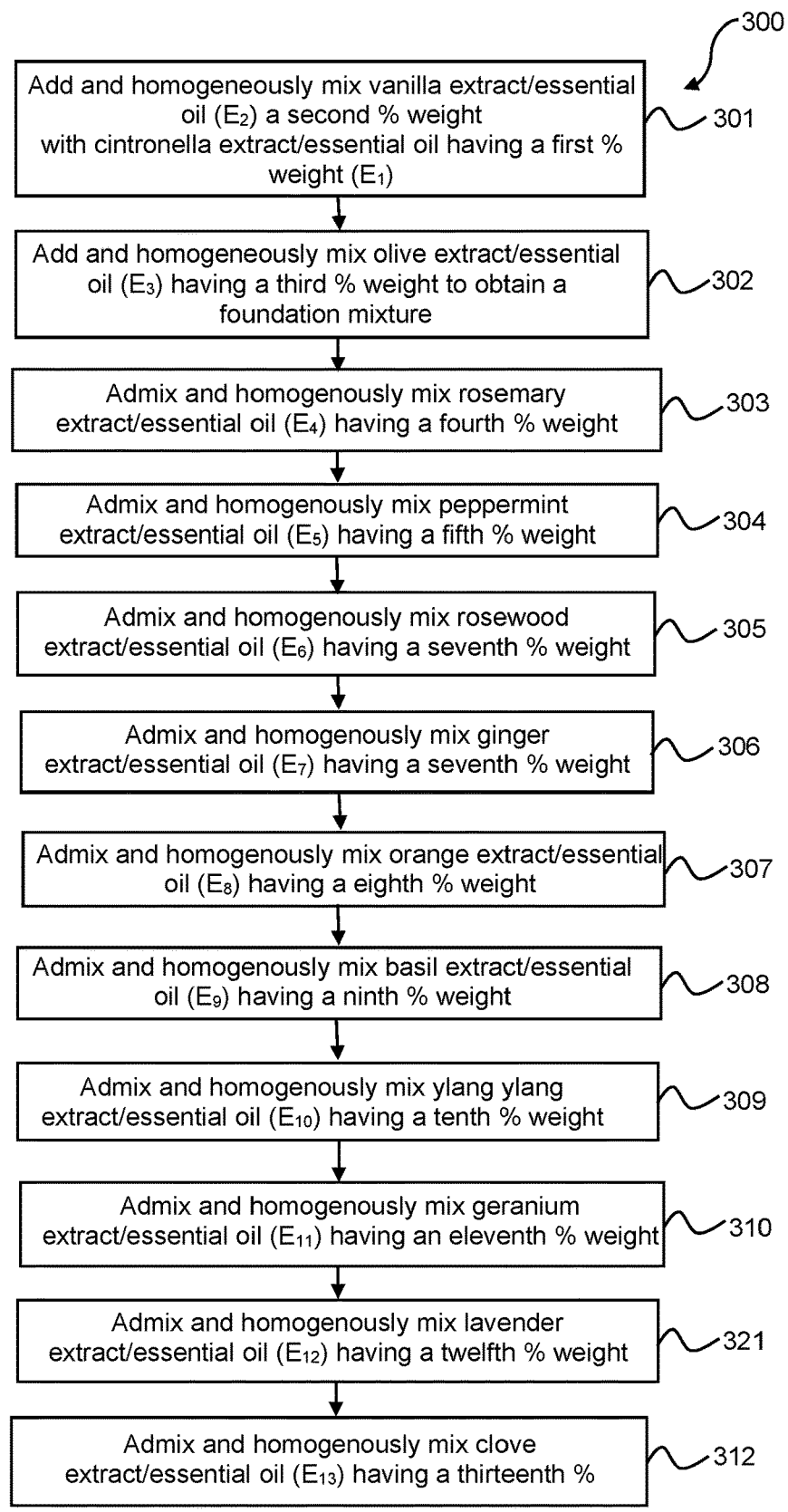
FIG. 3 is a flowchart illustrating a specific process of manufacturing the multipurpose mosquito repellent composition in accordance with an exemplary embodiment of the present invention.

Now referring to FIG. 3, a flowchart 300 of a process of manufacturing a multipurpose mosquito repellent in accordance with an exemplary embodiment of the present invention.

At step 301, a citronella extract/essential oil (*Cymbopogon winterianus*) having a first predetermined percentage (%) by weight is mixed with a vanilla extract/essential oil (*Vanilla planifolia*) having a second predetermined percentage (%) by weight. Citronella extract/essential oil ($E_1$) is found in lemongrass which is a very strong, however, short-term mosquito repellent. There are approximately 55 species of lemongrass. However, in some embodiments of the present invention, citronella extract/essential oil ($E_1$) includes either common lemongrass or citronella Java lemongrass. Citronella extract/essential oil ($E_1$) contains the following chemical compounds: citronellol, geraniol, geranyl acetate, limonene, linalool, borneol, a-pinene, and b-pinene. In an exemplary embodiment of the present invention, all three formulations of multipurpose mosquito repellent composition is comprised of 15.7 to 16.21% by weight of citronella extract/essential oil.

Vanilla ($E_2$) is added to prolong the repellency of Citronella extract/essential oil ($E_1$). Vanilla ($E_2$), containing Eugenol, is extracted from vanilla beans which are the only solid in the formulation of the multipurpose mosquito repellent composition. Vanilla extract/essential oil is included in step 301 to prolong the repellency of lemongrass extract/essential oil. In other words, citronella extract/essential oil will take place more slowly, thereby improving the design efficiency of the multipurpose mosquito repellent composition of the present invention. In different aspects of the present invention, other types of compounds that can replace vanilla such as pistachio powder and vanilla musk. However, vanilla extract/essential oil ($E_2$) is preferred because it is cheap and well-known in the market. In an exemplary embodiment of the present invention, all three formulations of multipurpose mosquito repellent composition is comprised of 0.03% by weight of vanilla extract/essential oil.

At step 302 an olive extract/essential oil (*Olea europaea*) having a third predetermined percentage (%) by weight is added to the above temporary mixture to obtain a foundation mixture as described above. Olive extract/essential oil ($E_3$), an odorless oil, has skin care property which can be applied directly on human skins without any harm. On the contrary, Olive extract/essential oil ($E_3$) is rich in carbohydrates, vitamins, phenolic compounds, fatty acids, antioxidants, and minerals. Epidemiological data suggest that phenolic component and other antioxidants in Olive extract/essential oil ($E_3$) are responsible to skin and health benefits. In an exemplary embodiment of the present invention, a first and second formulations of multipurpose mosquito repellent composition is comprised of 0% by weight of olive extract/essential oil. In another exemplary embodiment of the present invention, a third formulation of multipurpose mosquito repellent composition is comprised of 52.4 to 54.04% by weight of olive extract/essential oil.

At step 303, a rosemary extract/essential oil (*Rosmarinus officinalis*) having a fourth predetermined percentage (%) by weight is homogeneously dissolved in the foundation mixture of step 302. The major constituents of rosemary extract/essential oil ($E_4$) are 1,8-Cineole (26.54%) and α-Pinene (20.14%) which show pronounced antibacterial and antifungal activity. In an exemplary embodiment of the present invention, all three formulations of multipurpose mosquito repellent composition is comprised of 11.5-11.89% by weight of rosemary extract/essential oil.

At step 304, a peppermint extract/essential oil (*Mentha arvensis L.*) having a fifth predetermined percentage (%) by weight by weight is homogeneously dissolved in the temporary mixture of step 303. Peppermint extract/essential oil ($E_5$) includes menthol, menthone, and menthyl acetate. Peppermints, a perennial plant, shows significant antibacterial and antifungal activity as well as many health benefit properties such as analgesic, expectorant, diaphoretic, antimutagenic, febrifuge, salve, and stomachic, etc. In an exemplary embodiment of the present invention, all three formulations of multipurpose mosquito repellent composition is comprised of 1.3-2.70% by weight of peppermint extract/essential oil.

At step 305, a rosewood extract/essential oil (*Aniba rosaeodora Ducke*) having a sixth predetermined percentage (%) by weight is homogeneously dissolved in the temporary mixture of step 304. The major compound of rosewood extract/essential oil ($E_6$) is linalool and benzyl benzoate and is used in the production of perfumes. In an exemplary embodiment of the present invention, a first and second formulations of multipurpose mosquito repellent composition is comprised of 0% by weight of rosewood extract/essential oil. In another exemplary embodiment of the present invention, a third formulation of multipurpose mosquito repellent composition is comprised of 0.76% by weight of rosewood extract/essential oil.

At step 306, a ginger extract/essential oil (*Zingiber officinale*) having a seventh predetermined fifth percentage (%) by weight is homogeneously dissolved in the temporary mixture of step 305. Ginger extract/essential oil ($E_7$); obtained from the rhizome of the *Zingiber officinale* and containing linalool, camphene, eucalyptol, borneol; has shown numerous therapeutic roles in the health management such as anti-bacterial, inhibition of inflammatory activity, etc. In an exemplary embodiment of the present invention, a first and second formulations of multipurpose mosquito repellent composition is comprised of 0% by weight of ginger extract/essential oil. In another exemplary embodiment of the present invention, a third formulation of multipurpose mosquito repellent composition is comprised of 0.03% by weight of ginger extract/essential oil.

At step 307, an orange extract/essential oil (*Citrus sinensis*) having an eighth percentage (%) by weight is homogeneously dissolved in the temporary mixture of step 306. Orange extract/essential oil ($E_8$) is extracted from either orange peels or orange rinds, which contains limonene, cymene, and linalool which demonstrates to have aromatic and medicinal properties beneficial to users. In an exemplary embodiment of the present invention, a first and second formulations of multipurpose mosquito repellent composition is comprised of 0% by weight of orange extract/essential oil. In another exemplary embodiment of the present invention, a third formulation of multipurpose mosquito repellent composition is comprised of 1.10% by weight of orange extract/essential oil.

At step 308, a basil extract/essential oil (*Ocimum basilicum*) having a ninth percentage (%) by weight is homogeneously dissolved in the temporary mixture of step 307. Basil extract/essential oil ($E_9$) is commonly known as sweet basil which contains methyl eugenol and shows antimicrobial property. In an exemplary embodiment of the present invention, a first and second formulations of multipurpose mosquito repellent composition is comprised of 0% by weight of basil extract/essential oil. In another exemplary embodiment of the present invention, a third formulation of multipurpose mosquito repellent composition is comprised of 0.02% by weight of basil extract/essential oil.

At step 309, an ylang ylang extract/essential oil (*Cananga odorata*) having a tenth percentage (%) by weight is homogeneously dissolved in the temporary mixture of step 308. Ylang ylang extract/essential oil ($E_{10}$) is also known as cananga which contains eugenol, linalool, geraniol, among other chemical compounds that show anti-cicrobial, analgesic, anti-inflammatory, cleansing, anti-acne properties. In an exemplary embodiment of the present invention, all three formulations of multipurpose mosquito repellent composition is comprised of 1.35-2.60% by weight of ylang ylang extract/essential oil.

At step 310 a geranium extract/essential oil (*Pelargonium graveolens*) having eleventh percentage (%) by weight is homogeneously dissolved in the temporary mixture of step 309. Geranium extract/essential oil ($E_{11}$) is an estoeric oil which contains linalool, cintronellol, geraniol, among other chemical compounds that are astringent, haemostatic, cicatrisant, cytophylactic, diuretic, deodorant, haemostatic, styptic, tonic, among other properties. In an exemplary embodiment of the present invention, all three formulations of multipurpose mosquito repellent composition is comprised of 12.00-12.43% by weight of geranium extract/essential oil.

At step 311, a lavender extract/essential oil (*Lavandula angustifolia*) having a twelfth percentage (%) by weight is homogeneously dissolved in the temporary mixture of step 310. Lavender extract/essential oil ($E_{12}$) is one of the most favorite essential oils as it contains a-pinene, limonene, 1,8 cineole, linalool, caryophyllene that shows various therapeutic properties including antiseptic, analgesic, anti-inflammatory, antiviral, bactericide, carminative, cholagogue, cicatrisant, cordial, cytophylactic, decongestant, deodorant, diuretic, emmenagogue, hypotensive, nervine, rubefacient, sedative, and sudorific. In an exemplary embodiment of the present invention, a first formulation of multipurpose mosquito repellent composition is comprised of 0% by weight of basil extract/essential oil. In another exemplary embodiment of the present invention, a second formulation of multipurpose mosquito repellent composition is comprised of 0.80% by weight of lavender extract/essential oil. In another exemplary embodiment of the present invention, a third formulation of multipurpose mosquito repellent composition is comprised of 0.80% by weight of lavender extract/essential oil.

At step 312, a clove extract/essential oil (*Syzygium aromaticum*) having a thirteenth percentage (%) by weight is homogeneously dissolved in the temporary mixture of step 311 to obtain the multipurpose mosquito repellent composition of the present invention. Clove extract/essential oil ($E_{13}$) is a spice that has a sweet and aromatic flavor and also potent medicinal properties that is rich in antioxidants which are the property of eugenol. In addition to eugenol, Clove extract/essential oil ($E_{13}$) also contain vitamin C, also an antioxidant. In an exemplary embodiment of the present invention, all three formulations of multipurpose mosquito repellent composition is comprised of 1.3-1.35% by weight of clove extract/essential oil.

All aromatic and medicinal extract/essential oils ($E_1$-$E_{13}$) and their predetermined percentage (%) by weight are listed below in three different formulations in Table 1. In the present invention, the degree of repellency depends on the relative percentage (%) by weight. The third formulation is better than the second formulation which is better than the first formulation.

TABLE 1

Extract/Essential Oil Components of the Multipurpose Mosquito Repellent Composition.

| Ref. No. | Name of Extract/ Essential Oil | Percentage (%) Formulation | | |
|---|---|---|---|---|
| | | First formulation | Second formulation | Third formulation |
| $E_1$ | Citronella Java essential oil | 15.7-16.21 | 15.7-16.21 | 15.7-16.21 |
| $E_1$ | Lemongrass essential oil | 0.00-0.40 | 0.00-0.40 | 0.00-0.40 |
| $E_{10}$ | Ylang Ylang | 1.35-2.60 | 1.35-2.60 | 1.35-2.60 |
| $E_2$ | Vanilla | 0.00-0.03 | 0.00-0.03 | 0.00-0.03 |
| $E_5$ | Peppermint | 1.3-2.70 | 1.3-2.70 | 1.3-2.70 |
| $E_4$ | Rosemary | 11.5-11.89 | 11.5-11.89 | 11.5-11.89 |
| $E_{13}$ | Clove | 1.3-1.35 | 1.3-1.35 | 1.3-1.35 |
| $E_{11}$ | Geranium | 12-12.43 | 12-12.43 | 12-12.43 |
| $E_{12}$ | Lavender | 0.00-0.00 | 0.00-0.80 | 0.00-0.80 |
| $E_7$ | Ginger | 0.00-0.00 | 0.00-0.00 | 0.00-0.03 |
| $E_6$ | Rosewood | 0.00-0.00 | 0.00-0.00 | 0.00-0.70 |
| $E_9$ | Basil oil | 0.00-0.00 | 0.00-0.00 | 0.00-0.02 |
| $E_8$ | Orange | 0.00-0.00 | 0.00-0.00 | 0.00-1.10 |
| $E_3$ | Olive | 0.00-0.00 | 0.00-0.00 | 52.4-54.04 |

After method 300 is performed in specific order indicated above multipurpose mosquito repellent composition includes medicinal chemical components listed in Table 2 below.

TABLE 2

Medicinal Chemical Components of the Multipurpose Mosquito Repellent

| No. | Name of Medicinal Components | W/W (%) |
|---|---|---|
| 1 | Alpha-pinene ($C_{10}H_{16}$) | 8.81-9.65 |
| 2 | Camphene ($C_{10}H_{16}$) | 1.52-2.69 |

TABLE 2-continued

Medicinal Chemical Components of the
Multipurpose Mosquito Repellent

| No. | Name of Medicinal Components | W/W (%) |
| --- | --- | --- |
| 3 | P-Cymene ($C_{10}H_{14}$) | 1.67-2.55 |
| 4 | D-Limonene ($C_{10}H_{16}$) | 3.76-4.12 |
| 5 | 1,8-Cineol ($C_{10}H_{18}O$) | 9.41-10.93 |
| 6 | Linalool ($C_{10}H_{18}O$) | 5.21-6.33 |
| 7 | Citronellol ($C_{10}H_{18}O$) | 15.34-17.82 |
| 8 | Iso-Borneol ($C_{10}H_{18}O$) | 4.05-4.49 |
| 9 | Iso-Menthone ($C_{10}H_{18}O$) | 3.05-3.76 |
| 10 | Menthol ($C_{10}H_{20}O$) | 4.42-4.89 |
| 11 | Geraniol ($C_{10}H_{18}O$) | 2.48-2.97 |
| 12 | Eugenol ($C_{10}H_{12}O_2$) | 4.04-4.57 |
| 13 | Geranyl acetate ($C_{12}H_{20}O_2$) | 1.54-3.04 |
| 14 | Caryophyllene ($C_{15}H_{24}$) | 1.83-1.93 |
| 15 | Benzyl Benzoate ($C_{14}H_{12}O_2$) | 2.03-2.54 |

In the present invention, alpha pinene has a percentage (%) by weight of 8.81~9.65% in an embodiment of the invention. Alpha-pinene is a natural organic compound belonging to the terpenoid group, it is found in rosemary and pine oil. Alpha Pinene is used in the treatment, control, prevention, and improvement of diseases, syndromes, and symptoms such as inflammation, bacterial infection, and memory support. Alpha-pinene can be used directly as a food additive.

In the present invention, camphene has percentage (%) by weight of 1.52~2.69%. Camphene is used in the perfume industry and can be extracted from ginger extract/essential oil, orange extract/essential oil and citronella extract/essential oil.

P-Cymene is found in rosemary extract/essential oil and has percentage (%) by weight of 1.67-2.55%.

D-limonene has found in orange extract/essential oil and has percentage by weight of 3.76-4.12%. D-limonene is found in the peel of the lemon which is used as a fragrance in perfumes.

1,8 Cineol has percentage (%) by weight of 9.41-10.93% and also known as eucalyptol, an organic compound found in rosemary extract/essential oil and peppermint extract/essential oil. Cineol is a colorless liquid that is oft-used as a flavoring agent because of its fragrance which is a mint-like smell and a spicy, cooling effects.

Linalool has 5.21-6.33% in the multipurpose mosquito repellent composition of the present invention. It is found in almost all extract/essential oils listed above in Table 1. In other words, linalool is widely distributed in the plant kingdom. Linalool has a sedative, spasmolytic, anesthetic, and aromatic properties.

Citronellol which is the most important ingredient in the multipurpose mosquito repellent composition found in citronella and geranium extracts/essential oils. Citronellol includes percentage (%) by weight of 9.54-17.82% in the present invention. Citronellol is used in perfumes and insect repellents.

Iso-borneol has a percentage (%) by weight of 4.05-4.49% and found in rosemary, peppermint, and clove extract/essential oils. Iso-borneol is also known as Yu Yee oil which literally means "as one wishes", a medicated ointment oil.

Iso-menthone, found in menthol, has a percentage (%) by weight of 3.05~3.76% in an exemplary embodiment of the present invention. Iso-menthone has anti-inflammatory properties and is found in peppermint essential oil.

Menthol includes 4.42~4.89% percentage (%) by weight in an embodiment of the present invention. Menthol is found in peppermint extract/essential oil, it has strong anesthetic properties including anti-inflammatory.

Geraniol has a percentage (%) by weight of 2.48~2.97% percentage (%) by weight in an embodiment of the present invention. Geraniol is found in rosemary extract/essential oil and java citronella essential oil. In addition to mosquito repellency, it is also a precious flavoring used in the aromatherapy industry and pharmaceuticals to help beautify the skin and create scents that are widely used in the market.

Eugenol has a percentage (%) by weight 4.04~4.57% in an embodiment of the invention. Eugenol is the main ingredient of essential oils extracted from clove extract/essential oil which has been shown to be an antiseptic, anesthetic, and analgesic product.

Geranyl acetate has a percentage (%) by weight of 1.54~3.04% in an embodiment of the present invention. Geranyl acetate is a natural ingredient of more than 60 different essential oils found in lemon grass, orange oil, geranium, and peppermint extracts/essential oils. Geranyl acetate is used as a component of perfumes, flavoring ingredients for creams and soaps.

Caryophyllene has a percentage (%) by weight of 1.83~1.93% in an embodiment of the present invention. Caryophyllene is found in clove and rosemary extracts/essential oils which are aromatic compounds.

Benzyl benzoate is found in ylang ylang, rosewood, geranium extracts/essential oils which show strong antiseptic properties. In the multipurpose mosquito repellent of the present invention, Benzyl benzoate has a percentage (%) by weight of 2.03~2.54%.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A composition for repelling mosquitoes comprising:
   15.7-16.21% by weight of Citronella Java extract/essential oil;
   1.35-2.6% by weight of Ylang Ylang extract/essential oil;
   1.3-2.70% by weight Peppermint extract/essential oil;
   11.5-11.89% by weight Rosemary extract/essential oil;
   1.3-1.35% by weight of Clove extract/essential oil;
   12-12.43% by weight Geranium extract/essential oil;
   0-0.40% by weight Lemongrass extract/essential oil;
   0-0.03% by weight Vanilla extract/essential oil;
   0-0.80% by weight Lavender extract/essential oil;
   0-0.30% by weight Ginger extract/essential oil;
   0-0.70% by weight Rosewood extract/essential oil;
   0-0.02% by weight Basil extract/essential oil;
   0-1.10% by weight Orange extract/essential oil; and
   0-54.04% by weight Olive extract/essential oil.

2. The composition of claim 1, wherein the composition comprises:
   8.81-9.65% by weight α-pinene;
   1.52%-2.69% by weight camphene;

1.67%-2.55% by weight p-cymene;
3.67%-4.12% by weight d-limonene;
9.41%-10.93% by weight 1,8 cineol;
5.21%-6.33% by weight linalool;
15.34%-17.82% by weight citronellol;
4.05%-4.49% by weight iso-borneol;
3.05%-3.76% by weight iso-menthone;
4.42%-4.89% by weight menthol;
2.48%-2.97% by weight geraniol;
4.04%-4.57% by weight eugenol;
1.54%-3.04% by weight geraniol acetate;
1.83%-1.93% by weight caryophyllene; and
2.03%-2.54% by weight benzyl benzoate.

3. A method of repelling mosquitoes comprising topically applying a composition to a subject in need thereof, wherein the composition comprises:
15.7-16.21% by weight of Citronella Java extract/essential oil;
1.35-2.6% by weight of Ylang Ylang extract/essential oil;
1.3-2.70% by weight Peppermint extract/essential oil;
11.5-11.89% by weight Rosemary extract/essential oil;
1.3-1.35% by weight of Clove extract/essential oil;
12-12.43% by weight Geranium extract/essential oil;
0-0.40% by weight Lemongrass extract/essential oil;
0-0.03% by weight Vanilla extract/essential oil;
0-0.80% by weight Lavender extract/essential oil;
0-0.30% by weight Ginger extract/essential oil;
0-0.70% by weight Rosewood extract/essential oil;
0-0.02% by weight Basil extract/essential oil;
0-1.10% by weight Orange extract/essential oil; and
0-54.04% by weight Olive extract/essential oil.

4. The method of claim 3, wherein the composition comprises:
8.81-9.65% by weight α-pinene;
1.52%-2.69% by weight camphene;
1.67%-2.55% by weight p-cymene;
3.67%-4.12% by weight d-limonene;
9.41%-10.93% by weight 1,8 cineol;
5.21%-6.33% by weight linalool;
15.34%-17.82% by weight citronellol;
4.05%-4.49% by weight iso-borneol;
3.05%-3.76% by weight iso-menthone;
4.42%-4.89% by weight menthol;
2.48%-2.97% by weight geraniol;
4.04%-4.57% by weight eugenol;
1.54%-3.04% by weight geraniol acetate;
1.83%-1.93% by weight caryophyllene; and
2.03%-2.54% by weight benzyl benzoate.

5. A method of making a mosquito repelling composition comprising:
sequentially mixing in a container Vanilla extract/essential oil, Lemongrass extract/essential oil, Citronella Java essential oil, Olive extract/essential oil, Rosemary extract/essential oil, Peppermint extract/essential oil, Rosewood extract/essential oil, Ginger extract/essential oil, Orange extract/essential oil, Basil extract/essential oil, Ylang Ylang extract/essential oil, Gernamiun extract/essential oil, Lavender extract/essential oil, and Clove extract/essential oil to form a mixture;
wherein after each addition of an extract/essential oil the mixture is stirred until the mixture is homogenous; and
wherein the composition comprises 15.7-16.21% by weight of Citronella Java extract/essential oil; 1.35-2.6% by weight of Ylang Ylang extract/essential oil; 1.3-2.70% by weight Peppermint extract/essential oil; 11.5-11.89% by weight Rosemary extract/essential oil; 1.3-1.35% by weight of Clove extract/essential oil; 12-12.43% by weight Geranium extract/essential oil; 0-0.40% by weight Lemongrass extract/essential oil; 0-0.03% by weight Vanilla extract/essential oil; 0-0.80% by weight Lavender extract/essential oil; 0-0.30% by weight Ginger extract/essential oil; 0-0.70% by weight Rosewood extract/essential oil; 0-0.02% by weight Basil extract/essential oil; 0-1.10% by weight Orange extract/essential oil; and 0-54.04% by weight Olive extract/essential oil.

\* \* \* \* \*